Patented May 11, 1943

UNITED STATES PATENT OFFICE

2,318,704

PRODUCTION OF ARTIFICIAL FILAMENTS, FOILS, AND LIKE SHAPED ARTICLES

Robert Wighton Moncrieff and Charles William Sammons, Spondon, near Derby, England, assignors to Celanese Corporation of America, a corporation of Delaware No Drawing. Application February 27, 1941, Serial No. 380,814. In Great Britain April 2, 1940

3 Claims. (Cl. 18—54)

This invention relates to the production of artificial filaments, foils and like shaped articles, and more particularly to the production of artificial filaments, threads, yarns, films, foils and like shaped articles having a basis of highly polymeric organic substances.

There have recently been developed a large number of highly polymeric fibre- and/or film-forming organic substances. For example, it has been shown that substances of this nature may be produced by condensing diamines with dicarboxylic or disulphonic acids, or aminocarboxylic acids or aminosulphonic acids with themselves, or diacid-amides with diacids or with dihalogen derivatives of hydrocarbons, if the condensation is continued until products of molecular weight from about 4,000 up to 6,000 or 10,000 or more are obtained. In this connection, reference is made to the following applications, where further particulars of these substances and of their production are given:

U. S. application S. No. 300,985 filed October 24, 1939

U. S. application S. No. 311,570 filed December 29, 1939

U. S. application S. No. 311,931 filed December 30, 1939

U. S. application S. No. 311,571 filed December 29, 1939

U. S. applicaiton S. No. 316,366 filed January 23, 1940

U. S. application S. No. 316,367 filed January 30, 1940

U. S. application S. No. 316,368 filed January 30, 1940

U. S. application S. No. 318,708 filed February 13, 1940

U. S. application S. No. 318,712 filed February 13, 1940

U. S. application S. No. 324,909 filed March 15, 1940

U. S. application S. No. 324,091 filed March 15, 1940

U. S. application S. No. 324,089 filed March 15, 1940

U. S. application S. No. 300,986 filed October 24, 1939

U. S. application S. No. 336,591 filed May 22, 1940

U. S. application S. No. 344,601 filed July 9, 1940

U. S. application S. No. 344,602 filed July 9, 1940

U. S. application S. No. 365,499 filed November 13, 1940

U. S. application S. No. 375,954 filed January 25, 1941

U. S. application S. No. 375,955 filed January 25, 1941

U. S. application S. No. 378,610 filed February 12, 1941

We have now found that those highly polymeric substances, and particularly such as contain radicles containing basic nitrogen atoms, especially the polycarbonylamides and the polysulphonamides, may be converted into shaped materials by shaping their solutions in phenolic solvents, setting them in organic liquid media which comprise a substantial proportion of ketone of the formula $R_1.CO.R_2$, where $R_1$ is a methyl radicle or a substitution derivative thereof, and $R_2$ is a methyl or ethyl radicle or a substitution derivative thereof. For the purposes of the present specification and claims, homologues of methyl and ethyl radicles and substitution derivatives of such homologues are not to be regarded as substitution derivatives of the methyl and ethyl radicles.

While the xylenols are the preferred solvents for the purposes of the invention, other phenols may be employed. Among such may be mentioned, phenol, the cresols, alpha- and beta-naphthols, resorcinol and other di- or polyhydroxybenzenes, and substituted phenols such as, for example, the halogenated phenols, e. g. o- and p-chlorophenol, 2.4-dichlor-phenol and 3-hydroxy-6-chlortoluene, amino-phenols, e. g. m-aminophenol, salicylic acid, o-hydroxy benzyl alcohol and the oxy-di-phenyls.

It is naturally essential that the solution should be in a fluid or highly plastic condition while it is being shaped. If the nature of the components and the composition of the solution is such that it is solid at ordinary temperatures, the solution must be heated to a temperature suitable for shaping; for example, the solution may be heated to a temperature of about 10–15° C. up to 100° C. or more above the melting point of the solution. Thus, a solution which melts at about 120° C. may advantageously be shaped at a temperature of about 180° C.

The concentration of the solution may be varied according to a number of factors. For example, the solution may have a concentration of the order of 30–35% by weight or less up to 70 or even 90% or more. In general, it is preferable to employ solutions of concentration about 40–65%.

The solutions may be prepared in any suitable manner, but a particularly satisfactory method, especially for preparing solutions of high concentration, comprises agitating an appropriate amount of the polymeric substance with a large excess of the solvent, if desired at elevated temperature, until a solution is produced, and then evaporating excess solvent until the residue has the desired concentration. For example, a granulated highly polymeric amide formed by heating the hexamethylene diamine salt of adipic until a fibre-forming polymer has been produced, may be agitated at about 50° C. with 4 times its weight of xylenol until it is dissolved, and xylenol may then be distilled from the resulting solution until an 80 or 90% solution remains. Advantageously the solution may be formed directly in the process of producing the polymeric substance, adjustment of concentration being subsequently carried out if necessary; for example, the condensation to form a polymer from the above-mentioned salt may be carried out by heating the salt in xylenol and, if desired, the resultant solution of polyamide concentrated by evaporation or diluted by adding more xylenol.

The setting medium preferably comprises a substantial proportion of acetone, though other ketones of the formula $R_1.CO.R_2$, as defined above, may be employed, e. g. methyl ethyl ketone, chloracetone, acetol, acetol methyl ether and acetol acetate. These compounds may be employed in the setting medium either singly or in admixture with each other. If desired, other non-solvent agents may be present in the setting medium, e. g. acetophenone, methyl alcohol, ethyl acetate, diethyl ether, petroleum ether or toluene. Where the characteristics of the main constituent of the setting medium permit, small proportions of water may be present in the medium; for example, the setting medium may comprise acetone containing about 4–6% by weight of water. Further, swelling agents for the polymeric compounds may be incorporated in the setting media in proportions of 5–10 up to 25 or 35% by weight so as to reduce the speed of setting. Such swelling agents may advantageously be the same as those employed as the solvents in the solutions to be set. However, other agents may be employed, for example aliphatic mono-, di- or poly-carboxylic acids, e. g. formic acid, acetic acid, lactic acid, stearic acid, succinic acid, adipic acid and citric acid, or amides, e. g. methyl formamide, acetamide, adipamide or p-toluene sulphonamide. Such other swelling agents may be incorporated in the polymer solution itself if desired, especially in small proportions, e. g. of the order of 2–5 or 7% by weight, either in addition to or instead of incorporating them in the setting medium.

Preferably, the ketone of the formula $R_1.CO.R_2$, as defined above, or the mixture of such ketones constitutes at least 70–80% by weight of those components of the setting medium which exert no substantial swelling action on the polymeric substance, though smaller proportions, e. g. 55–60% or less, may be employed if desired.

While it is generally necesary to shape the polymer solution at elevated temperature, e. g. at a temperature of 70–200° C. or more, it is preferable to maintain the setting medium at a relatively low temperature, e. g. 15 or 20 to 30° C., though higher temperatures may be employed in some instances. It is important to maintain the shaping device, e. g. the spinning orifice in filament formation, at the temperature of the polymer solution, and for this purpose it is preferable, more especially when the polymer solution is shaped at a high temperature, to maintain it at or about ½ to 1 inch or more above the surface of the setting medium in an atmosphere of an inert gas, e. g. nitrogen, hydrogen or carbon dioxide, the shaping device itself being kept at the desired temperature by an electrical heating coil or other suitable heating device. Where the temperature difference between the shaping device and the bulk of the setting medium is relatively small, the polymer solution may pass directly from the shaping device to the medium, but conditions for this modification must not be such as to cause ebullition of the medium or to induce violent convection currents in it.

In carrying out the process, the polymer solution may be heated to the desired degree in any suitable manner, especially by passing it through a heated narrow tube as described in U. S. application S. No. 375,762 filed January 24, 1941, and fed, preferably through a filtering medium, to the shaping device. The feeding and extrusion may take place under gravity or under pressure, applied, for example, by means of pumps, as described in U. S. application S. No. 375,761, filed January 24, 1941, or by means of an inert liquid or vapour in the apparatus described in U. S. application S. No. 333,952 filed May 8, 1940, of Dr. H. Dreyfus. After immersion in the setting medium for a time sufficient to bring the shaped materials to a set condition, the materials may be wound up on a suitable device, which may advantageously take up the materials at a rate greater, for example 5, 10 or more times greater, than that at which they leave the shaping device. Drawing-down of the shaped materials may advantageously be effected in a number of stages; for example, a number of forwarding devices moving at progressively increasing speeds may be interposed in the path of travel of the materials from the shaping device to the take-up device. If desired, the materials may be passed through one or more washing baths, e. g. baths of low boiling petroleum hydrocarbons, and/or dried by passing through a hot gaseous medium before being wound up.

The products of the present invention may be employed for purposes to which shaped artificial materials have previously been applied. For example, filaments and threads may be twisted or doubled together to produce yarns, a number of filamentary products may be united under the influence of softening agents and/or heat and pressure to form bristles, straws and like materials, while sheet products may be employed for wrapping purposes or as intermediate layers in safety glass manufacture. If desired, bristles, straws and the like may be formed directly by the process of the invention provided that extrusion orifices of appropriate shape and size are employed.

The following example illustrates the invention:

*Example*

A solution of a fibre-forming polyamide is prepared by refluxing equimolecular proportions of hexamethylene diamine with adipic acid in redistilled xylenol, oxygen being excluded from the reaction vessel, and the concentration of the product is adjusted to 50% polymer and 50% xylenol. The resulting composition is fed at 180° C. by pumps as described in U. S. application S. No. 375,761 filed January 24, 1941, through heated tubes of ¼" diameter and through fine gauze filters to spinning jets. The jets, each of which carries a group of 7 orifices of diameter 0.006", are situated in a nitrogen atmosphere at points 1" above the surface of a bath of acetone containing 4% by weight of water maintained at 25° C. The jets themselves are maintained at substantially 180° C. by the combined influence of the fused composition and of electrical heating coils which closely surround them and which serve to screen the acetone bath as far as possible from heat radiated from the jet faces. The extruded materials are led through the bath by appropriate guides and are withdrawn from the bath in a substantially set condition by means of a take-up roller rotating at a speed adapted to draw down the materials during their passage from the orifices. The products are found to be evenly solidified and to display very good tenacity and elasticity.

Having described our invention, what we desire to secure by Letters Patent is:

1. Process for the production of artificial filaments, threads, yarns, films, foils and like shaped articles, which comprises shaping a solution of a highly polymeric fibre- or film-forming polyamide in a phenolic solvent, and setting it in an organic liquid medium which comprises from 70 to 96%, based on the weight of the components of said medium which exert no substantial swelling action on said polyamide, of at least one substance selected from the group consisting of acetone, methyl ethyl ketone, chloracetone, acetol, acetol methyl ether and acetol acetate.

2. Process for the production of artificial filaments, threads, yarns, films, foils and like shaped articles, which comprises shaping a solution of a highly polymeric fibre- or film-forming polyamide in xylenol, and setting it in an organic liquid medium which comprises from 70 to 96%, based on the weight of the components of said medium which exert no substantial swelling action on said polyamide, of at least one substance selected from the group consisting of acetone, methyl ethyl ketone, chloracetone, acetol, acetol methyl ether and acetol acetate.

3. Process for the production of artificial filaments, threads, yarns, films, foils and like shaped articles, which comprises shaping a solution comprising about 40-65% by weight of a highly polymeric fibre- or film-forming polyamide in xylenol, and setting it in an organic liquid medium which comprises from 70 to 96%, based on the weight of the components of said medium which exert no substantial swelling action on said polyamide, of at least one substance selected from the group consisting of acetone, methyl ethyl ketone, chloracetone, acetol, acetol methyl ether and acetol acetate.

ROBERT WIGHTON MONCRIEFF.
CHARLES WILLIAM SAMMONS.